United States Patent [19]

Williams

[11] Patent Number: 5,065,152

[45] Date of Patent: Nov. 12, 1991

[54] TWO-WIRE LOOP ELECTRIC CIRCUIT ARRANGEMENT

[75] Inventor: Timothy D. N. Williams, Chichester, United Kingdom

[73] Assignee: Rosemount Limited, West Sussex, England

[21] Appl. No.: 282,310

[22] Filed: Jan. 25, 1989

[30] Foreign Application Priority Data

Apr. 6, 1987 [GB] United Kingdom ................. 8708171

[51] Int. Cl.[5] ................................................ H04Q 9/00

[52] U.S. Cl. .......................... 340/825.36; 340/870.39; 340/310 A

[58] Field of Search ...................... 340/825.36, 825.77, 340/870.16, 870.39, 310 R, 310 A, 533, 538, 825.05; 379/413, 348, 307; 375/24

[56] References Cited

U.S. PATENT DOCUMENTS

| | | | |
|---|---|---|---|
| 4,520,488 | 5/1985 | Houvig et al. | 340/870.39 |
| 4,603,318 | 7/1986 | Philp | 340/310 R |
| 4,623,871 | 11/1986 | Akano | 340/870.39 |
| 4,831,375 | 5/1989 | Kajiura | 340/870.39 |
| 4,926,158 | 5/1990 | Zeigler | 340/310 A |

FOREIGN PATENT DOCUMENTS 1417292 8/1973 United Kingdom .

OTHER PUBLICATIONS

Bob Stevens, Signal Transmissions Put on a Pedestal, Control and Instruments, Sep. 1976, pp. 28 and 29.

*Primary Examiner*—Donald J. Yusko
*Assistant Examiner*—Edwin C. Holloway, III
*Attorney, Agent, or Firm*—Kinney & Lange

[57] ABSTRACT

The circuit includes a loop (3) in which a signal current flows; a supply voltage generation circuit (1); a signal conversion circuit (2); a switch (5) operative to connect either the supply voltage generation circuit or the signal conversion circuit into the loop (3) at any instant, the outputs of the supply voltage generation circuit and the signal conversion circuit being supplied to a common load (4) which controls operation of the switch (5); and a pair of capacitors (6,7) connected across the outputs of the supply voltage generation circuit and the signal current conversion circuit, respectively.

7 Claims, 2 Drawing Sheets

TWO-WIRE LOOP ELECTRIC CIRCUIT ARRANGEMENT

BACKGROUND OF THE INVENTION

This invention relates to a two-wire loop electric circuit arrangement.

In telemetering or automatic control systems use is often made of a so-called 4–20 mA transmitter in combination with a two-wire loop, information being transmitted over the loop by analogue control of the current from the transmitter between the 4 mA and 20 mA limits. Such a transmitter can be considered to be a 4 mA constant current generator and a signal current generator providing a further 16 mA superimposed on the 4 mA.

In GB-A-1417292 there is disclosed such an arrangement in which a 4–20 mA transmitter is connected in the loop in series with a signal and power supply converter which utilises the 4 mA residual current in the loop, this being representative of a zero signal, to generate a supply voltage for a load, and which operates to convert any signal current above the 4 mA limit into a voltage proportional to that signal current, the signal voltage generated being supplied to the load. The load thus receives a power supply voltage and a signal voltage from the converter, both voltages being derived from the loop current from the 4–20 mA transmitter. The load can be any appropriate type of control, indicating or alarm circuit, or a signal conditioning unit.

Such a known arrangement has the advantage that no separate power supply is needed for the load.

However, in the known arrangement the supply voltage generation circuitry is connected in series with the signal conversion circuitry in the converter and this introduces an additional voltage drop into the loop. In many arrangements the available total loop driving voltage is limited, for safety or other reasons, and the additional voltage drop introduced must be substracted from that available to other devices in the loop.

Further, it is common practice to connect a diode in the loop either to provide protection against inadvertent polarity reversal, or as a test point for connection of, for example, an analogue moving coil meter. It would be desirable to connect a measuring instrument across such diode such that the loop current is diverted into the instrument, but this would place severe constraints on the voltage available to the instrument.

SUMMARY OF THE INVENTION

According to this invention there is provided a two-wire loop electric circuit arrangement, including a loop in which in use a signal current flows; a supply voltage generation circuit; a signal current conversion circuit; switch means operative to connect either the supply voltage generation circuit or the signal current conversion circuit into the loop at any instant, the outputs of the supply voltage generation circuit and the signal current conversion circuit being supplied to a common load which includes a switch control for controlling operation of the switch means; and a pair of capacitors connected across the outputs of the supply voltage generation circuit and the signal current conversion circuit respectively.

With the arrangement of this invention the loop current, which can be derived from a 4–20 mA transmitter as discussed above, is supplied to the supply voltage generation circuit and the signal current conversion circuit alternately. The signal on the loop is sampled while the loop current is supplied to the signal current conversion circuit and the corresponding signal voltage stored in the associated capacitor for transmission to the load. When no loop current is being supplied to the supply voltage generation circuit its output is maintained by the associated capacitor. Operation of the switch means is controlled in dependence upon the permissible decay in the voltage on each of the two capacitors. The time of permissible decay of the capacitors determines the times of operation of the switch means to connect each of the supply voltage generation circuit and the signal current conversion circuit into the loop.

BRIEF DESCRIPTION OF THE DRAWINGS

This invention will now be described by way of example with reference to the drawings, in which.

DESCRIPTION OF THE PREFERRED EMBODIMENT(S)

Figure 1:
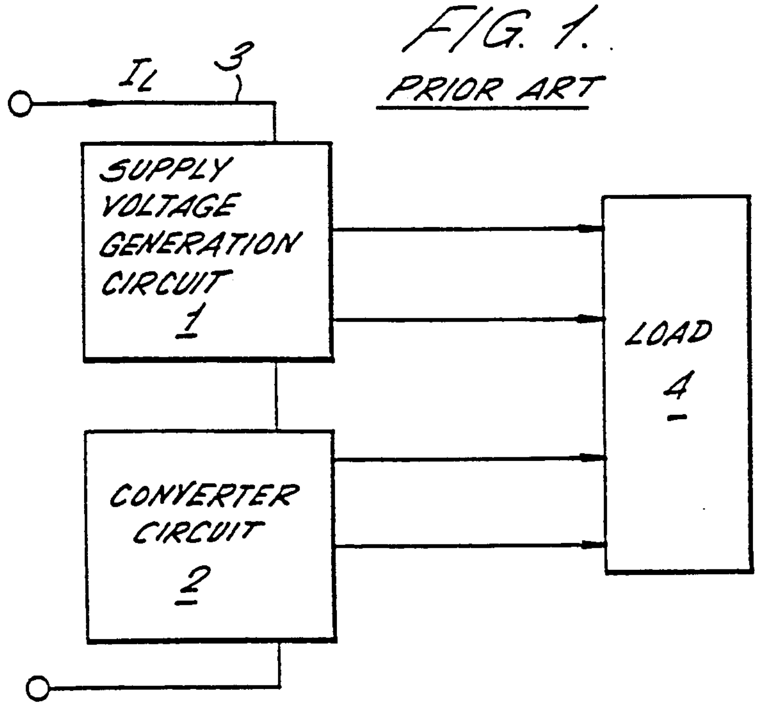
FIG. 1. PRIOR ART
FIG. 1 is a block diagram of a known arrangement as discussed above.

FIG. 1 shows a known arrangement as discussed above, comprising a supply voltage generation circuit 1 and a signal current conversion circuit 2 connected in series in a two-wire loop 3 carrying a loop current I derived from a 4–20 mA transmitter. The outputs of the generator circuit 1 and the converter circuit 2 are supplied to a load 4 which can be any appropriate type of control, indicating or alarm circuit, or a signal conditioning unit. The generator circuit 1 utilises the 4 mA residual current in the loop 3, this being representative of a zero signal, to generate a supply voltage for the load 4. The converter circuit 2 operates to convert any signal current in the signal loop 3 and the 4 mA residual current level into a voltage proportional to that current. The load 4 thus receives a power supply voltage and a signal voltage from the circuits 1 and 2, both voltages being derived from the current in the loop 3.

Figure 2:
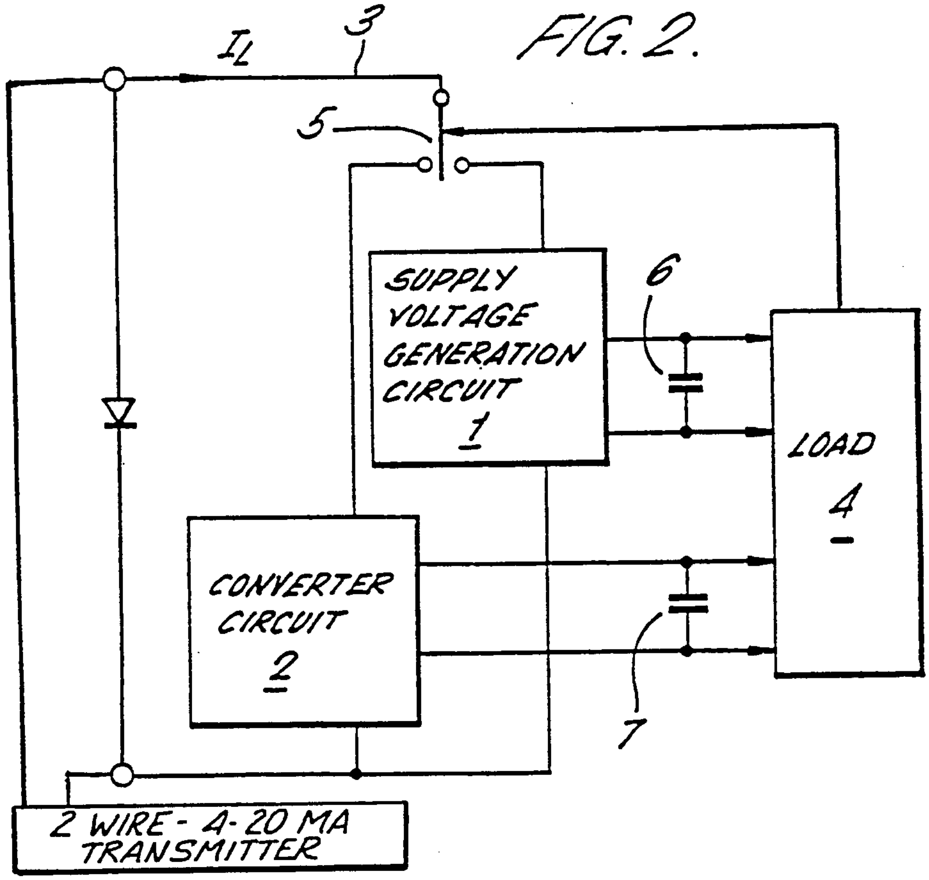
FIG. 2 is a block diagram of an arrangement according to the invention.

Referring now to FIG. 2, this shows an arrangement in accordance with this invention, parts corresponding to parts shown in FIG. 1 having the same reference numerals.

In this arrangement the supply voltage generation circuit 1 and the signal current conversion circuit 2 are connectible into the loop 3 by way of a switch means 5 opeative to connect either the circuit 1 or the circuit 2 into the loop 3 at any instant, the switch 5 means being controlled from the load 4 with a switch control 4. A pair of capacitors 6 and 7 are connected across the outputs of the circuits 1 and 2, respectively, the circuits 1 and 2 being such that when inactive they do not draw current from the capacitors 6 and 7.

With this arrangement the current in the loop 3 is supplied to the circuits 1 and 2 alternately, and thus the voltage drop in the loop 3 is kept to a minimum. The arrangement operates as described above. Both the circuits 1 and 2 can be designed to give a potential difference of only a few hundred millivolts, and thus the arrangement can be connected across a forward biased diode, as indicated in FIG. 2, to steal the loop current therefrom, without adverse effects.

Figure 3:
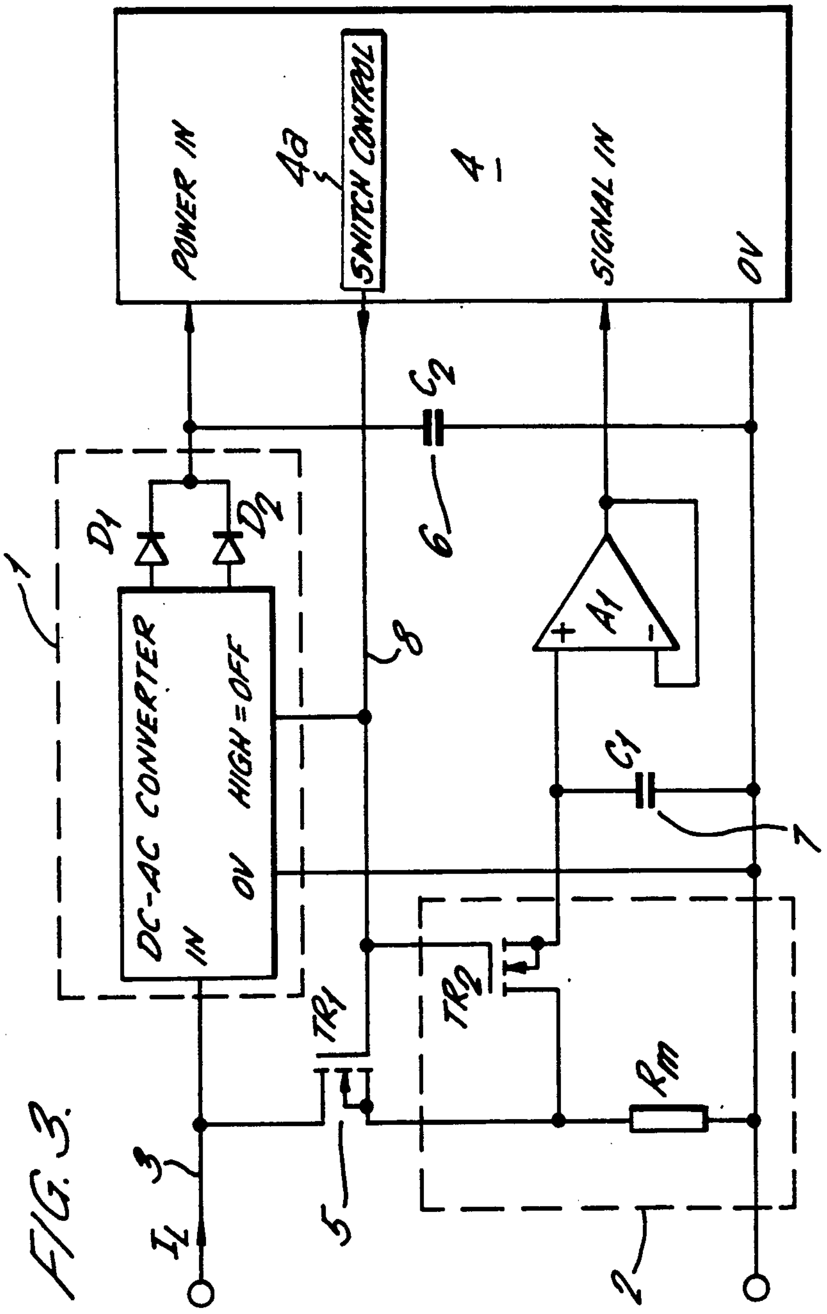
FIG. 3 is a circuit diagram of the arrangement of FIG. 2.

Referring now to FIG. 3, this shows a circuit diagram of the arrangement of FIG. 2.

The switch means 5 comprises a MOSFET transistor $TR_1$ with low "on" resistance, which switches the input loop signal current through the signal current conversion circuit 2, when its gate terminal receives a high control signal on line 8 from the load 4. At the same time the high level on the line 8 switches the supply voltage generating circuit 1 off so that it no longer takes any of the loop current. The circuit 2 is constituted by a resistor Rm through which the input loop signal current flows, and an isolating means in the form of a MOSFET transistor $TR_2$ which is gated on by the high control signal on line 8 from the load 4, allowing the voltage developed across the resistor Rm, which voltage is proportional to the signal current, to charge capacitor 7 which is connected across the output of the circuit 2.

When the circuit 1 is off and is not receiving the loop current, capacitor 6 which is connected across the output of the circuit 1, supplies the necessary supply voltage to the load 4.

When the control signal on line 8 from the load 4 goes low the transistors $TR_1$ and $TR_2$ are switched off, and the circuit 1 which comprises a DC-AC converter and a pair of diodes $D_1$ and $D_2$ by way of which the output of the converter is fed to the load 4 and to charge the capacitor 6, is on. No input loop signal current is supplied to the circuit 2, when the circuit 1 is switched on and all the current feeds the circuit 1. At this time capacitor 7 is isolated from the resistor Rm by transistor $TR_2$ and is buffered by an op-amp $A_1$, and thus capacitor 7 retains its charge to provide the signal voltage during the time circuit 2 is not energized, and; until the next cyle when the circuit 2 is energised. The output of the op-amp $A_1$ feeds the signal voltage to the signal input of the load 4. The diodes $D_1$ and $D_2$ insure the supply voltage from capacitor 6 is provided to the load 4 when the circuit 1 is switched off. The capacitor 6 is connected between the diodes and the load 4.

The control signals on line 8 are sent by the load 4 at intervals high and low which form control pulses short enough to ensure that the permissible decays of the voltage stored by capacitors 6 and 7 are not exceeded.

I claim:

1. A two-wire loop electric circuit arrangement, including a loop in which in use a signal current flows; a supply voltage generation circuit; a signal current conversion circuit; switch means operative to selectively connect one of the supply voltage generation circuit and the signal current conversion circuit into the loop at any instant, the outputs of the supply voltage generation circuit and the signal current conversion circuit being supplied to a common load which controls operation of the switch means; and a pair of capacitors connected across the outputs of the supply voltage generation circuit and the signal current conversion circuit respectively.

2. An arrangement as claimed in claim 1, in which the signal current is derived from a 4–20 mA transmitter.

3. An arrangement as claimed in claim 1 in which the supply voltage generating circuit comprises a DC-AC converter and a plurality of diodes connected to in parallel to conduct the output of the converter to the load, the capacitor connected across the output of the supply voltage generation circuit being connected between the diodes and the load.

4. An arrangement as claimed in claim 1, in which the signal current conversion circuit comprises a resistor through which the signal current flows, the voltage developed across the resistor being used to charge the associated capacitor, and isolation means connected between the resistor and the associated capacitor and operative to isolate the associated capacitor from the resistor when the signal current is not flowing through the resistor.

5. An arrangement as claimed in claim 4, including an op-amp connected between the capacitor associated with the signal current conversion circuit and the load.

6. An arrangement as claimed in claim 4, in which the isolating means comprises a transistor.

7. An arrangement as claimed in claim 1, in which the switch means comprises by a transistor.

* * * * *